United States Patent [19]

O'Brien et al.

[11] Patent Number: 6,001,036
[45] Date of Patent: Dec. 14, 1999

[54] AUTOMATED CONTINUOUS HYDRAULIC VARIABLE SETTING TRACK

[76] Inventors: Jim O'Brien; Marvin Engstrom, both of 12622 232ND Street, Maple Ridge, Canada

[21] Appl. No.: 09/061,199

[22] Filed: Apr. 16, 1998

[51] Int. Cl.[6] .............................. F16H 7/08; B62D 55/14
[52] U.S. Cl. ............................................ 474/110; 305/146
[58] Field of Search .................................... 474/110, 135, 474/113–117, 133, 138; 305/141–146, 149, 154–155, 124, 125, 129, 130; 403/142, 143; 92/172

[56] References Cited

U.S. PATENT DOCUMENTS

| | | | |
|---|---|---|---|
| 2,837,378 | 6/1958 | Williams et al. .................... 305/145 X |
| 2,837,379 | 6/1958 | Selyem et al. ........................... 305/145 |
| 3,098,397 | 7/1963 | Schaefer .................................. 474/110 |
| 3,216,772 | 11/1965 | Day ......................................... 305/146 |
| 3,463,559 | 8/1969 | Gehrke ............................... 474/110 X |
| 3,826,543 | 7/1974 | Muller .................................... 305/146 |
| 3,841,715 | 10/1974 | Comer, Jr. et al. .................... 305/146 |
| 3,901,563 | 8/1975 | Day ........................................ 305/146 |
| 4,650,259 | 3/1987 | Alexander et al. .................... 305/146 |
| 4,677,908 | 7/1987 | Imanishi et al. ................... 74/89.15 X |

*Primary Examiner*—Tamara L. Graysay
*Assistant Examiner*—Marcus Charles

[57] ABSTRACT

A variable setting track system is provided including a track frame. A wheel assembly includes a wheel slidable with respect to the frame. A track is situated about the wheel and the track frame. Also included is a hydraulic mechanism coupled to the wheel for urging the same against the track.

7 Claims, 3 Drawing Sheets

AUTOMATED CONTINUOUS HYDRAULIC VARIABLE SETTING TRACK

BACKGROUND OF THE INVENTION

1. Field of the Invention

The present invention relates to track tensioning systems and more particularly pertains to a new automated continuous hydraulic variable setting track system for tensioning a track of a bulldozer or other tracked vehicle.

2. Description of the Prior Art

The use of track tensioning systems is known in the prior art. More specifically, track tensioning systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art track tensioning systems include U.S. Pat. Nos. 4,681,376; 4,323,283; 5,378,204; 5,005,920; 4,457,564; and U.S. Pat. No. Des. 348,966.

In these respects, the automated continuous hydraulic variable setting track system according to the present invention substantially departs from the conventional concepts and designs of the prior art, and in so doing provides an apparatus primarily developed for the purpose of tensioning a track of a bulldozer or other tracked vehicle.

SUMMARY OF THE INVENTION

In view of the foregoing disadvantages inherent in the known types of track tensioning systems now present in the prior art, the present invention provides a new automated continuous hydraulic variable setting track system construction wherein the same can be utilized for tensioning a track of a bulldozer or other tracked vehicle.

The general purpose of the present invention, which will be described subsequently in greater detail, is to provide a new automated continuous hydraulic variable setting track system apparatus and method which has many of the advantages of the track tensioning systems mentioned heretofore and many novel features that result in a new automated continuous hydraulic variable setting track system which is not anticipated, rendered obvious, suggested, or even implied by any of the prior art track tensioning systems, either alone or in any combination thereof.

To attain this, the present invention generally Comprises a track frame having an elongated linear bar with an upper surface and a lower surface. The track frame has a plurality of equally spaced rollers mounted to the lower surface thereof. The upper surface of the track frame further has a longitudinal slot formed therein adjacent to a front end thereof. Also included is a wheel assembly including a disk-shaped wheel residing within the slot of the bar of the track frame. A fork has a pair of ends rotatably mounted to the wheel. It should be noted that the fork is further slidable along the upper surface of the bar of the frame. A track is situated about the wheel and the rollers of the track frame. Next provided is a tension adjustment assembly including a stopper fixedly mounted on the upper surface of the bar of the track frame. The stopper extends upwardly from the bar with an aperture formed therein. A slider block is slidably mounted on the upper surface of the bar of the track frame between the fork of the wheel assembly and the stopper, as shown in FIG. 3. A threaded rod has a first end mounted to the slider block. A second end of such threaded rod is screwably coupled to a tension adjustment nut mounted on the fork of the wheel assembly. Mounted about the threaded rod and situated between the slider block and the fork of the wheel assembly is a spring. Finally, a hydraulic mechanism includes a cylinder mounted on the upper surface of the bar of the track frame. As shown in FIG. 3, a piston rod is situated within the cylinder. Such piston rod includes a first end slidably positioned through an aperture formed in the cylinder and the aperture of the stopper. The first end has a ball mounted thereon which is situated within a socket formed in the slider block. The piston rod further includes a second end with a piston having a diameter approximately equal to that of the cylinder. The piston has a plurality of equally spaced and sized annular grooves formed therein adjacent to a rear face thereof. As shown in the Figures, the annular grooves define a plurality of annular protrusions. Each protrusion further has a longitudinal cut out formed therein. Note FIG. 8. As shown, a size of each longitudinal cut out is inversely proportional to a distance thereof from the rear face of the piston. As shown in FIG. 3, each of the protrusions are situated at an upper apex of the piston in alignment with respect to each other. The cylinder house of the hydraulic mechanism further includes a pair of bores formed in an upper apex thereof adjacent to both a front and a rear of the cylinder.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new automated continuous hydraulic variable setting track system apparatus and method which has many of the advantages of the track tensioning systems mentioned heretofore and many novel features that result in a new automated continuous hydraulic variable setting track system which is not anticipated, rendered obvious, suggested, or even implied by any of the prior art track tensioning systems, either alone or in any combination thereof.

It is another object of the present invention to provide a new automated continuous hydraulic variable setting track system which may be easily and efficiently manufactured arid marketed.

It is a further object of the present invention to provide a new automated continuous hydraulic variable setting track system which is of a durable and reliable construction.

An even further object of the present invention is to provide a new automated continuous hydraulic variable setting track system which is susceptible of a low cost of manufacture with regard to both materials and labor, and which accordingly is then susceptible of low prices of sale to the consuming public, thereby making such automated continuous hydraulic variable setting track system economically available to the buying public.

Still yet another object of the present invention is to provide a new automated continuous hydraulic variable setting track system which provides in the apparatuses and methods of the prior art some of the advantages thereof, while simultaneously overcoming some of the disadvantages normally associated therewith.

Still another object of the present invention is to provide a new automated continuous hydraulic variable setting track system for tensioning a track of a bulldozer or other tracked vehicle.

Even still another object of the present invention is to provide a new automated continuous hydraulic variable setting track system that includes a track frame. A wheel assembly includes a wheel slidable with respect to the frame. A track is situated about the wheel and the track frame. Also included is a hydraulic mechanism coupled to the wheel for urging the same against the track.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
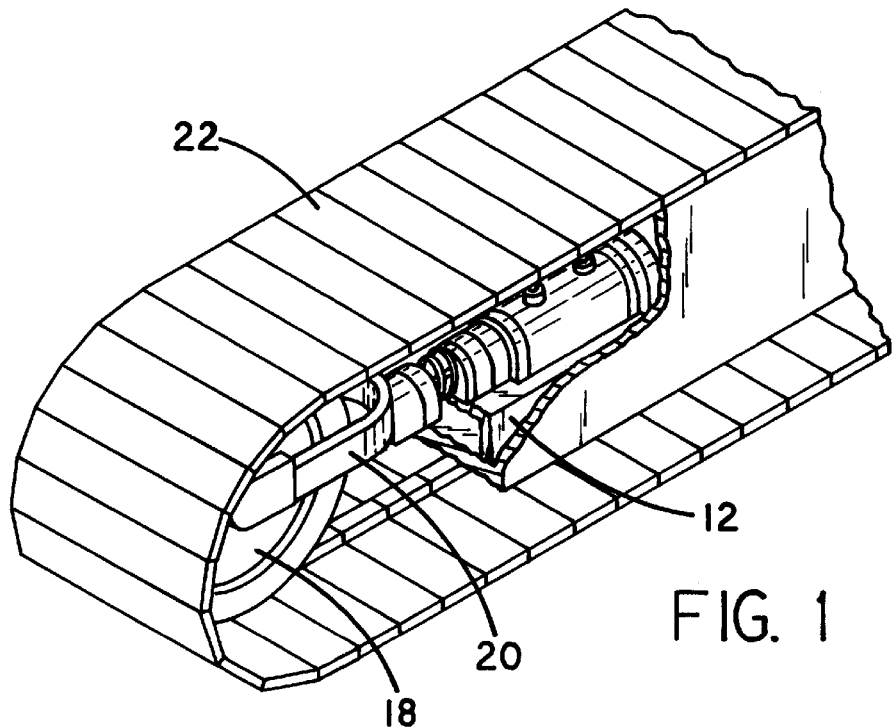
FIG. 1 is a perspective view of a new automated continuous hydraulic variable setting track system according to the present invention.
Figure 2:
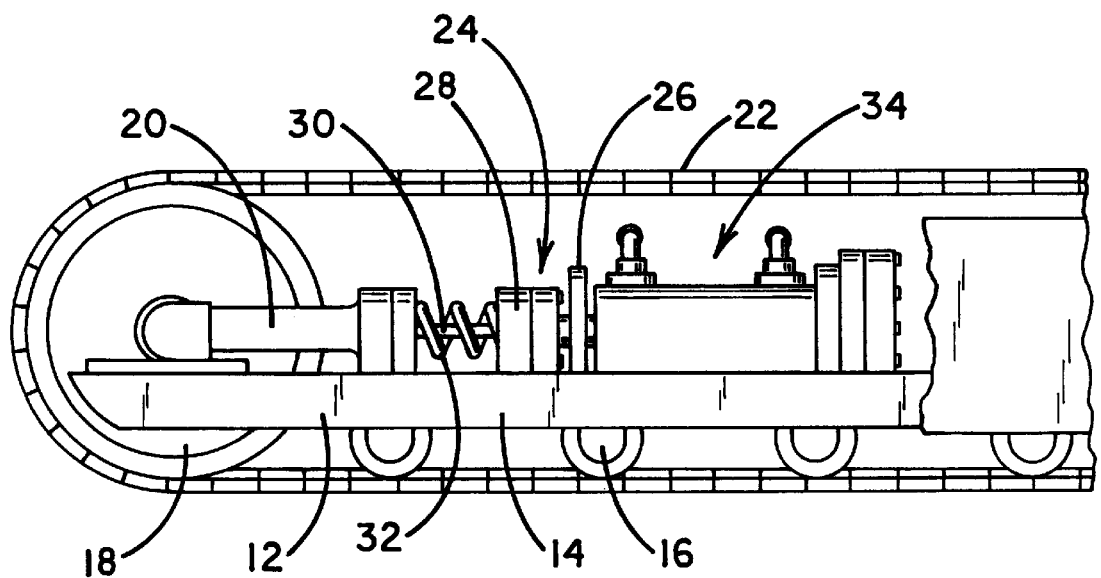
FIG. 2 is a side view of the present invention.

With reference now to the drawings, and in particular to FIGS. 1 through 8 thereof, a new automated continuous hydraulic variable setting track system embodying the principles and concepts of the present invention and generally designated by the reference numeral 10 will be described.

The present invention, designated as numeral 10, includes a track frame 12 having an elongated linear bar 14 with an upper surface and a lower surface. The track frame has a plurality of equally spaced rollers mounted on the lower surface thereof. The upper surface of the track frame further has a longitudinal slot formed therein adjacent to a front end thereof.

Also included is a wheel assembly including a disk-shaped wheel 18 residing within the slot of the bar of the track frame. A fork 20 has a pair of ends rotatably mounted to the wheel. It should be noted that the fork is further slidable along the upper surface of the bar of the frame. A track 22 is situated about the wheel and the rollers of the track frame.

Figure 3:
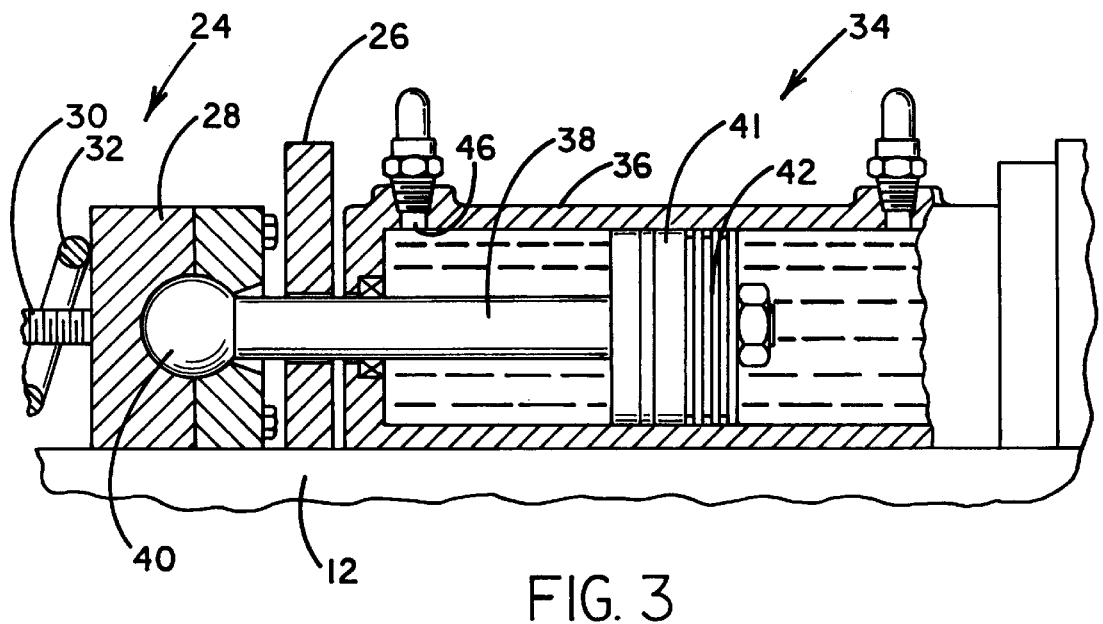
FIG. 3 is a cross-sectional view of the present invention depicting the hydraulic mechanism.

Next provided is a tension adjustment assembly 24 including a stopper 26 fixedly mounted on the upper surface of the bar of the track frame. The stopper extends upwardly from the bar with an aperture formed therein. A slider block 28 is slidably mounted on the upper surface of the bar of the track frame between the fork of the wheel assembly and the stopper, as shown in FIG. 3. A threaded rod 30 has a first end mounted to the slider block. A second end of such threaded rod is screwably coupled to a tension adjustment nut mounted on the fork of the wheel assembly. The nut is preferably rotatably coupled to the fork for allowing the same to be secured to a selected point along a length of the threaded rod. In the alternative, the threaded rod may be rotatable and the nut fixed, depending on the desires of the user. Mounted about the threaded rod and situated between the slider block and the fork of the wheel assembly is a spring 32 for preventing the inadvertent loosening of the tension rod.

Finally, a hydraulic mechanism 34 includes a cylinder 36 mounted on the upper surface of the bar of the track frame. As shown in FIG. 3, a piston 38 is situated within the cylinder. Such piston includes a first end slidably positioned through an aperture formed in the cylinder and the aperture of the stopper. The first end has a ball 40 mounted thereon which is situated within a socket formed in the slider block.

The piston further includes a second end with a piston 41 having a diameter approximately equal to that of the cylinder. The piston has a plurality of equally spaced and sized annular grooves 42 formed therein adjacent to a rear face thereof. As shown in the Figures, the annular grooves define a plurality of annular protrusions. Each protrusion further has a longitudinal cut out 44 formed therein. Note FIG. 8. As shown, a size of each longitudinal cut out is inversely proportional to a distance thereof from the rear face of the piston. As shown in FIG. 3, each of the protrusions are situated at an upper apex of the piston in alignment with respect to each other. The cylinder of the hydraulic mechanism further includes a pair of bores 46 formed in an upper apex thereof adjacent to both a front and a rear of the cylinder.

Figure 4:
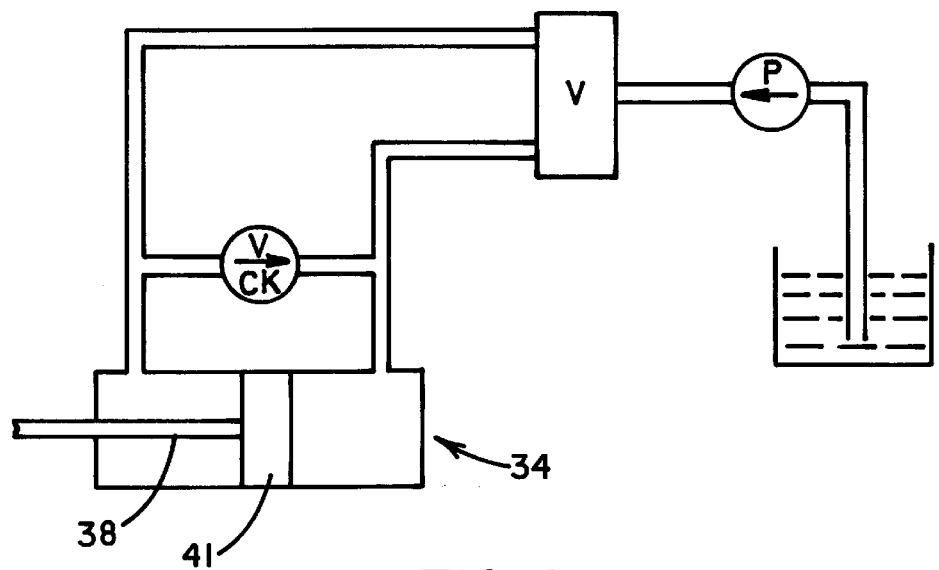
FIG. 4 is a schematic diagram of the present invention.
Figure 5:
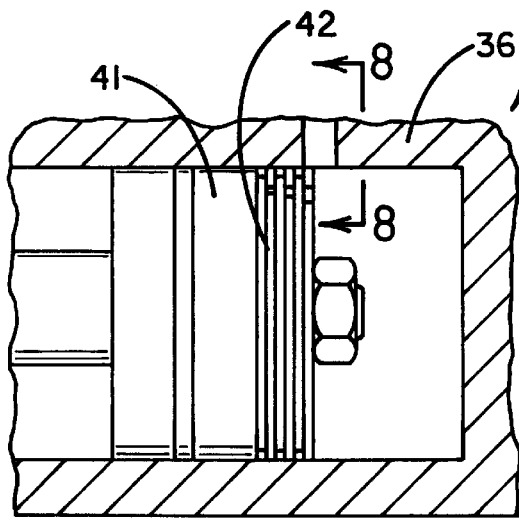
FIGS. 5–7 show the piston of the present invention functioning to decelerate the piston rod during use.
Figure 6:
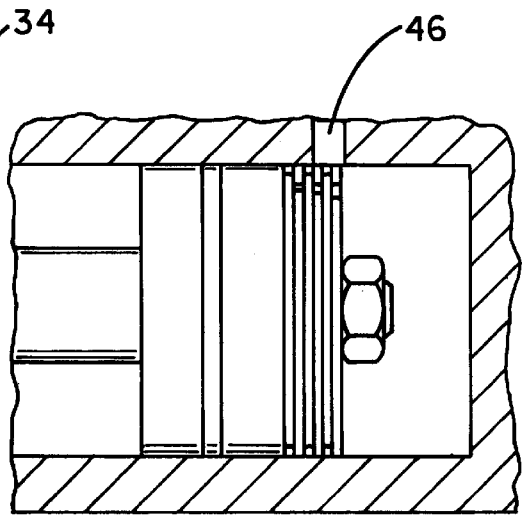
Figure 7:
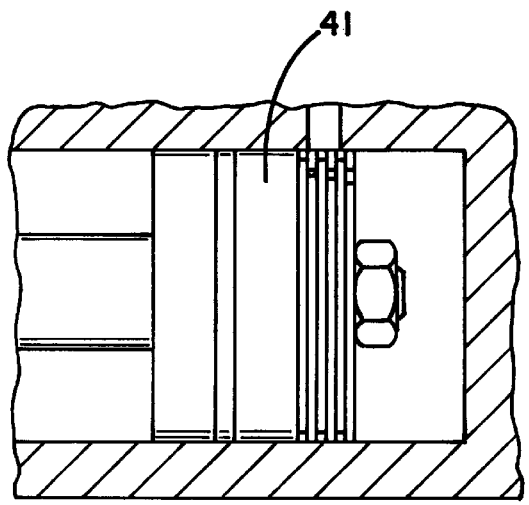
Figure 8:
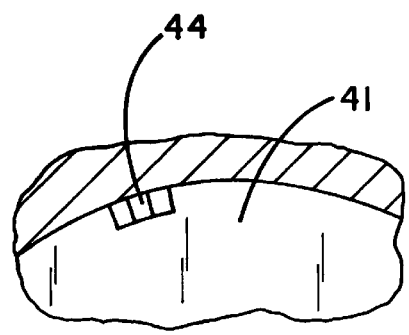
FIG. 8 is an end view of the piston of the present invention taken along line 8—8 shown in FIG. 5.

In use, the wheel may he selectively urged against the track by controlling the flow of fluid in and out of the bores 46 by way of a hydraulic system like that shown in FIG. 4. It should be understood that such control of the fluid may be automatic, manual or in any other manner desired by a user. As an option, a pressure relief valve may be included to preclude the pressure of the fluid within the cylinder from exceeding a predetermined amount. Further, a deceleration of the piston is effected by way of the flow of fluid through the annular grooves and slots of the piston. Note FIGS. 5–7.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A variable setting track system comprising, in combination:

a track frame including an elongated linear bar with an upper surface and a lower surface, the track frame having a plurality of equally spaced rollers mounted to the lower surface thereof, the upper surface of the track frame further having a longitudinal slot formed therein adjacent to a front end thereof;

a wheel assembly including a disk-shaped wheel residing within the slot of the bar of the track frame, a fork having a pair of ends rotatably mounted to the wheel and further slidable along the upper surface of the bar of the frame, wherein a track is situated about the wheel and the rollers of the track frame;

a tension adjustment assembly including a stopper fixedly mounted on the upper surface of the bar of the track frame and extending upwardly therefrom with an aperture formed therein, a slider block slidably mounted on the upper surface of the bar of the track frame between the fork of the wheel assembly and the stopper, a threaded rod having a first end mounted to the slider block and a second end screwably coupled to a tension adjustment nut mounted on the fork of the wheel assembly, and a spring mounted about the threaded rod and situated between the slider block and the fork of the wheel assembly; and a hydraulic mechanism including a cylinder mounted on the upper surface of the bar of the track frame and a piston rod situated within the cylinder and including a first end slidably positioned through an aperture formed in the cylinder and the aperture of the stopper, the first end having a ball mounted thereon which is situated within a socket formed in the slider block, the piston rod further including a second end with a piston having a diameter approximately equal to that of the cylinder, the piston having a plurality of equally spaced and sized annular grooves formed therein adjacent to a rear face of the piston thereby defining a plurality of annular protrusions, each protrusion having a longitudinal cut out formed therein with a size which is inversely proportional to a distance thereof from the rear face of the piston wherein each of the protrusions are situated proximate the rear face of the piston in alignment with respect to each other, the cylinder of the hydraulic mechanism further including a pair of bores having an orthogonal relationship to the piston, the bores being adjacent to both a front and a rear of the cylinder, whereby the wheel is selectively urgable against the track and a deceleration of the piston rod is effected by way of the flow of fluid through the annular grooves and slots of the piston.

2. A variable setting track system comprising:

a track frame;

a wheel assembly including a wheel slidable with respect to the frame, wherein a track is situated about the wheel and the track frame;

a track tension adjustment assembly including a stopper fixedly mounted on the track frame and extending upwardly therefrom with an aperture formed therein, a slider block being slidably mounted on the track frame between the wheel assembly and the stopper, a tension rod having a first end mounted to the slider block and a second end coupled to a tension adjustment nut mounted to the wheel assembly, and a spring mounted about the tension rod and situated between the slider block and the wheel assembly; and a hydraulic mechanism coupled to an end of the track tension adjustment assembly opposite the wheel for urging the same against the track.

3. A variable setting track system as set forth in claim 2 wherein the hydraulic mechanism includes a means for reducing the deceleration of a piston rod thereof, wherein the piston rod effects the urging of the wheel of the wheel assembly against the track.

4. A variable setting track system as set forth in claim 3 wherein the means includes a piston mounted on the piston rod with at least one longitudinal cut out formed therein.

5. A variable setting track system as set forth in claim 4 wherein the piston further has a plurality of annular grooves formed therein which define a plurality of annular protrusions.

6. A variable setting track system as set forth in claim 5 wherein a longitudinal cut out is formed in each annular protrusion such that each longitudinal cut out having a width that is not equivalent to the width of any other cut out.

7. A variable setting track system as set forth in claim 3 wherein a ball and socket joint is connected between the wheel and the piston rod.

* * * * *